US012307928B2

(12) United States Patent
Mo

(10) Patent No.: US 12,307,928 B2
(45) Date of Patent: May 20, 2025

(54) MULTIFUNCTIONAL LED SCREEN

(71) Applicant: Qifeng Mo, Shenzhen (CN)

(72) Inventor: Qifeng Mo, Shenzhen (CN)

( * ) Notice: Subject to any disclaimer, the term of this patent is extended or adjusted under 35 U.S.C. 154(b) by 0 days.

(21) Appl. No.: 18/373,964

(22) Filed: Sep. 28, 2023

(65) Prior Publication Data

US 2025/0111806 A1 Apr. 3, 2025

(51) Int. Cl.
*G09F 9/302* (2006.01)
*G09F 9/33* (2006.01)

(52) U.S. Cl.
CPC .............. *G09F 9/3026* (2013.01); *G09F 9/33* (2013.01)

(58) Field of Classification Search
CPC ................................ G09F 9/3026; G09F 9/33
See application file for complete search history.

(56) References Cited

U.S. PATENT DOCUMENTS

2012/0251072 A1* 10/2012 Cope ..................... G09F 9/3026 386/230
2016/0078789 A1* 3/2016 Hattori .................... G09F 13/04 40/573
2019/0239364 A1* 8/2019 Heo ..................... H05K 5/0217
2023/0245601 A1* 8/2023 Clark ........................ G09F 9/33 40/541
2024/0114634 A1* 4/2024 Zhao ..................... G09F 9/3023

* cited by examiner

*Primary Examiner* — Hong Zhou
(74) *Attorney, Agent, or Firm* — Ying-Ting Chen

(57) ABSTRACT

A multifunctional LED screen comprises a case body and a plurality of LED screen modules connected to the front of the case body, and the LED screen also comprises a display body connector and a display body, wherein the display body connector is detachably connected to the case body, the display body is detachably connected to the display body connector and the display body is provided with display message, and the LED screen is capable of displaying the content of the display message on the back of the LED screen when the display body connector is attached to the case body and the display body is attached to the display body connector.

18 Claims, 13 Drawing Sheets

MULTIFUNCTIONAL LED SCREEN

BACKGROUND OF THE PRESENT INVENTION

The present invention relates to an LED screen, and in particular refers to a multifunctional LED screen comprising a display body connector and the display body detachably connected to the case body and the display body connector, as well as provided with a multifunctional LED screen for displaying information.

FIELD OF INVENTION

As all know, LED screen, also called electronic display or floating word screen. It is composed of LED dot matrix, and by means of the light of the lamp beads to display text, picture, animation, video, LED screen content can be replaced at any time, each part of the components are modular structure of the display device. LED screen can not only be used for indoor environment but also be used for outdoor environment, with the advantages of the LED screen that the projector, TV wall and LCD display can not be compared to. LED screen has the characteristics of low operating voltage, low power consumption, miniaturization, endurableness, impact resistance and stable performance.

Currently large LED screen are spliced by a plurality LED screen bodies, each LED display body comprises case body and LED modules, and the plurality LED modules are assembled in the front of the case body when in production, so as to form an LED display body.

At present, the traditional LED display body lights in front after powering up, in order to display video information. The current traditional LED display body only has the role of displaying video information externally, and it is the mere function and the mere using scene, and the is the main drawback for the the prior art.

SUMMARY OF THE PRESENT INVENTION

The present invention provides a multifunctional LED screen, comprising: a case body 1 and t plurality of LED screen modules 2 connected to the front of the case body 1, wherein the LED screen comprises a display body connector 10 and a display body 20, and the display body connector 10 is detachably connected to the case body 1 and the display body 20 is detachably connected to the display body connector 10, wherein the display body 20 is provided with display information 21, and when the display body connector 10 is connected to the case body 1 and the display body 20 is connected to the display body connector 10, the LED screen is capable of displaying the content of the display information 21 on the back of the LED screen thereof.

The present invention provides a multifunctional LED screen, which comprises a display body connector 10 and a display body 20, wherein when the display body connector 10 is connected to the case body 1 and the display body 20 is connected to the display body connector 10, the LED screen is capable of displaying the content of the display information 21 at the back of the LED screen thereof, so as to enhance the display effect, which is the main purpose of the present invention.

The present invention provides a multifunctional LED screen, which comprises a frame connector 40, wherein the frame connector 40 can facilitate the assembly of the display body connector 10, which is another purpose of the present invention.

The present invention provides a multifunctional LED screen, which comprises a case assembly warning lock 60, which can facilitate the user to recognize the lock body status of opening and locking, which is another purpose of the present invention.

The present invention provides a multifunctional LED screen, which comprises an LED module display system 100, which is used to set up exhibits in front of the LED screen to enhance the display effect, which is another purpose of the present invention.

DETAILED DESCRIPTION OF THE PREFERRED EMBODIMENT

Figure 1:
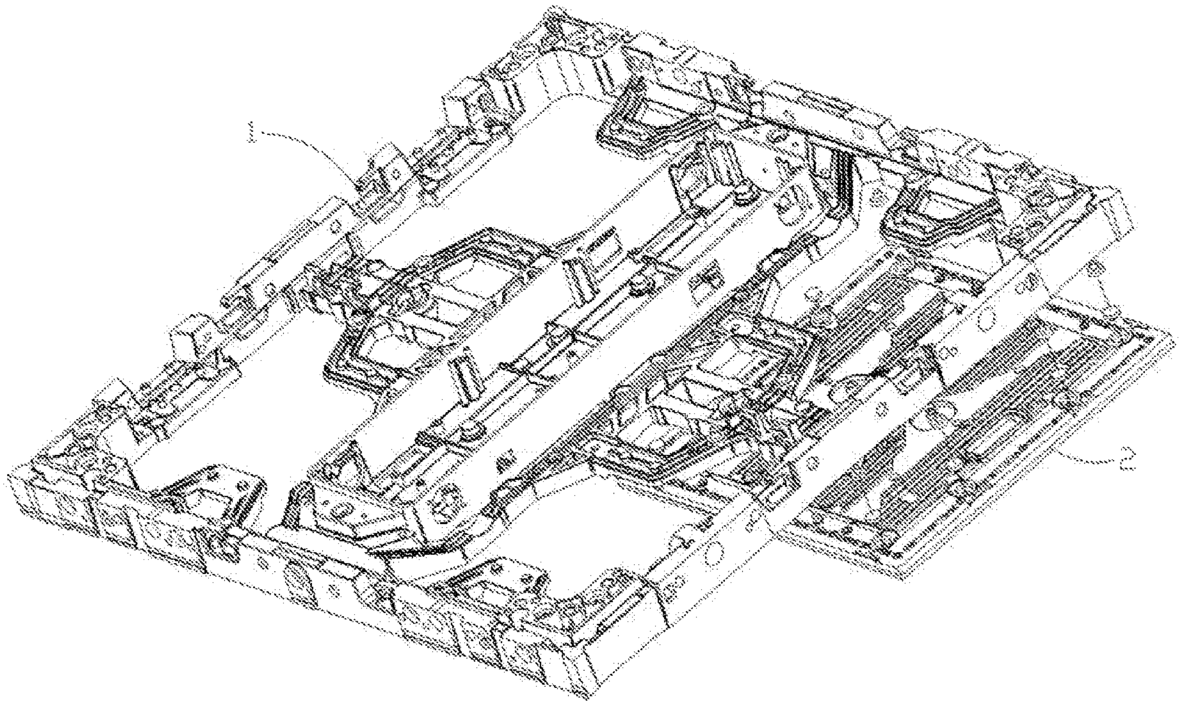
FIG. 1 is a perspective view of the case body and the LED screen module of the present invention.
Figure 2:
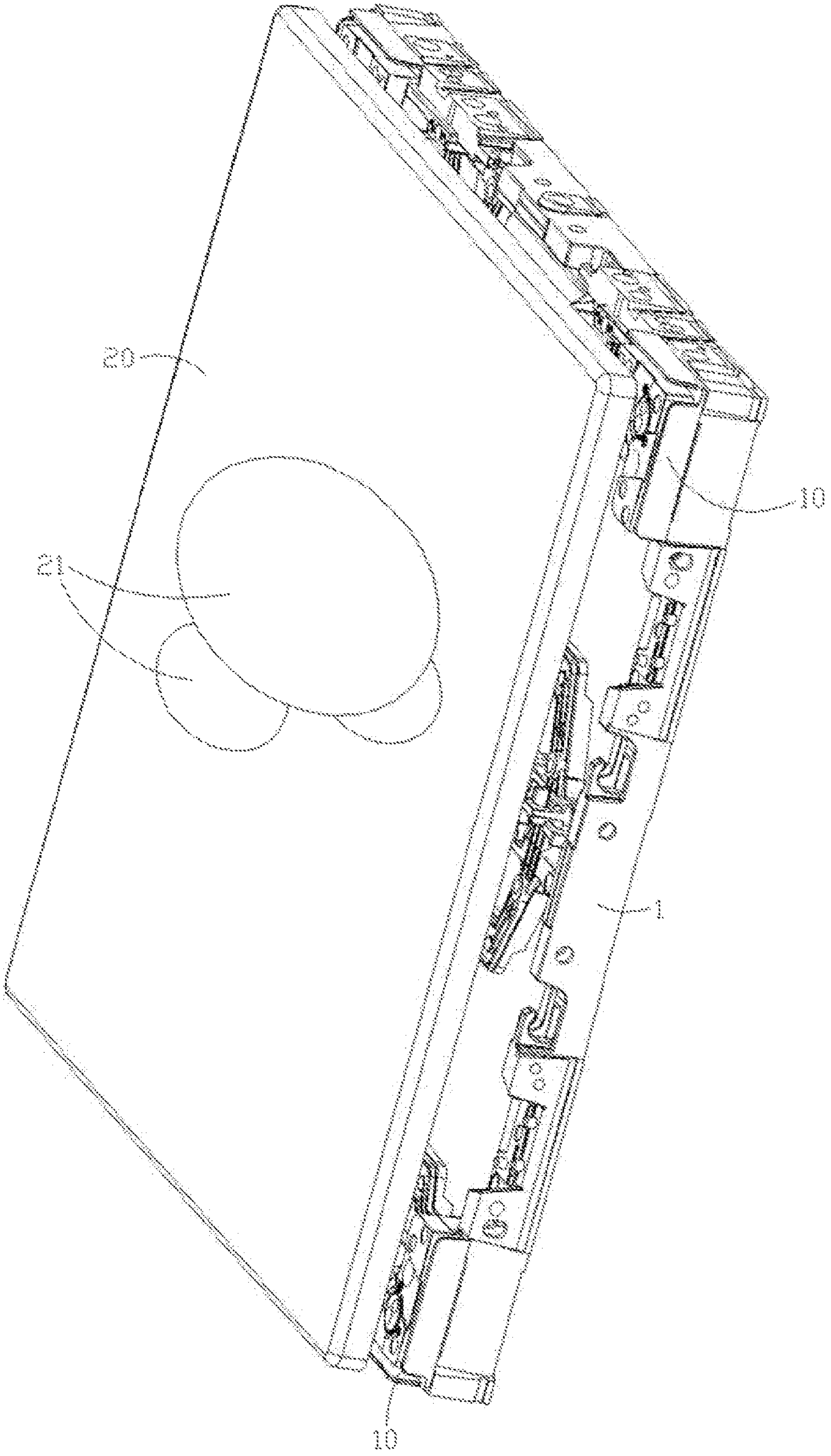
FIG. 2 is a perspective view of the display body of the present invention.
Figure 3:
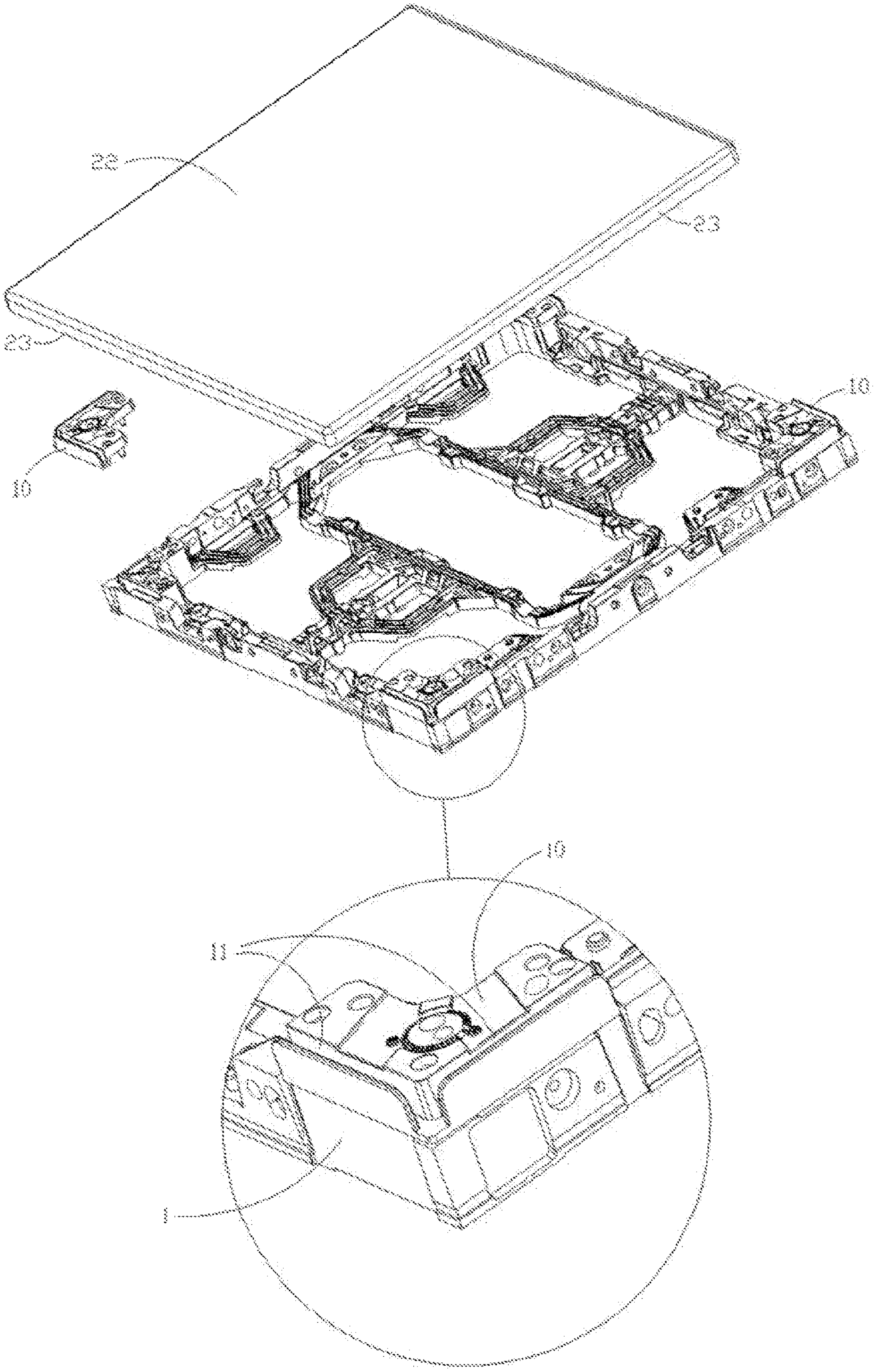
FIG. 3 is an enlarged view of the display body connector of the present invention.
Figure 4:
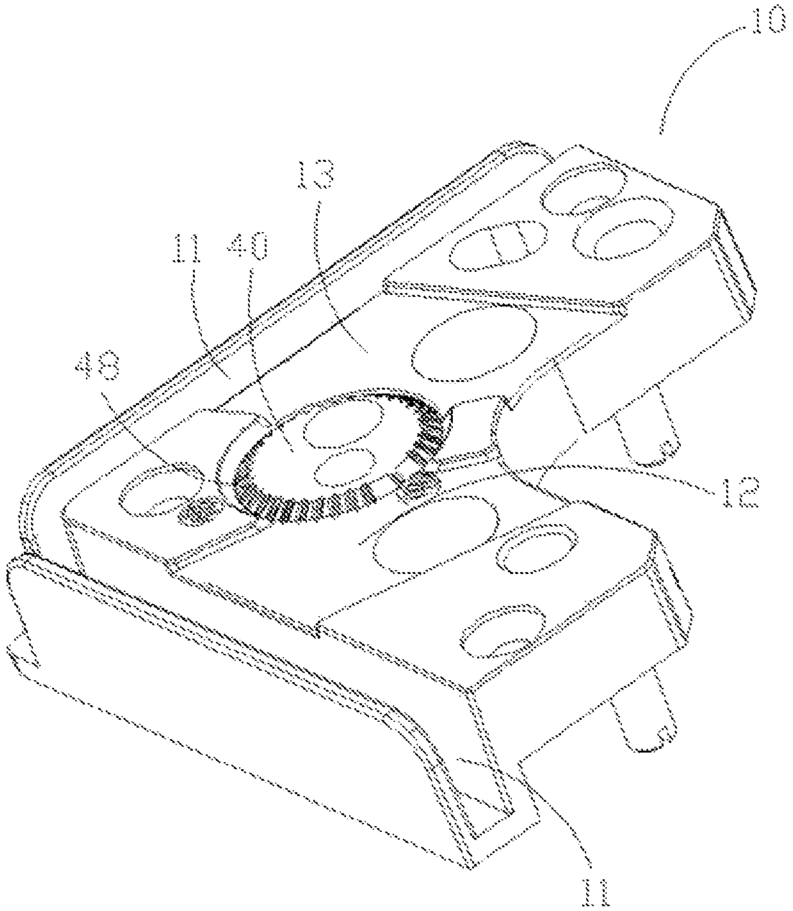
FIG. 4 is a stereoscopic perspective view of the display body connector of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. Just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

In the description of the present invention, it should be noted that the terms "mounted," "connected," and "linked" should be understood in a general manner, which could be, for example, affixedly connected, detachably connected, or integrally connected. Unless expressly specified and defined otherwise, it may also be a mechanical connection, an electrical connection or may be in communication with each other; it may be directly connected or indirectly connected by means of an intermediate medium, and may be an interaction relationship between two or more elements inside the two elements. For a person of ordinary skill in the art, the specific meanings of the above terms in the present invention may be understood according to specific situations.

As shown in FIGS. 1 to 13, a multifunctional LED screen comprises a case body 1 and a plurality of LED screen modules 2 connected to the front of the case body 1, wherein when on work, the LED screen is energized to emit light, and image information is sent outwardly by the plurality of LED screen modules 2 positioned at the front of the case body 1.

As shown in FIGS. 1 to 4, the LED screen further comprises a display body connector 10 and a display body 20, wherein the display body connector 10 is detachably connected to the case body 1, and the display body 20 is detachably connected to the display body connector 10, wherein the display body 20 is provided with a display information 21, and when the display body connector 10 is connected to the case body 1 and the display body 20 is connected to the display body connector 10, the LED screen is capable of displaying the content of the display information 21 on the back of the LED screen thereof.

In other word, when the LED screen is in use, photoelectric image information is sent outwardly by the plurality of LED screen modules 2 on the front of the LED screen thereof, and the content of the display information 21 is displayed by the display body 20 on the back of the LED screen thereof, so as to achieve the function of enhancing the display and display effect of the LED screen.

The LED screen of the present invention is particularly suitable for use in exhibitions, venues and other places, and both the front and back sides of the LED screen are capable of displaying and exhibiting advertisements or other information, which can significantly enhance the display and advertising effect.

When the display body connector 10 is detached from the case body 1, the LED screen can be used as a conventional LED screen.

In one embodiment, the display body 20 is an advertising cloth, and the display information 21 can be a printed advertising pattern.

In one embodiment, the plurality of display body connectors 10 are detachably connected to the back corner positions of the case body 1, and the plurality of display body connectors 10 have the same structure to facilitate production and assembly, wherein each of the display body connectors 10 is provided with an assembly slot 11, wherein the display body 20 comprises a display cloth 22 and an insertion body 23 connected to the periphery of the display cloth 22, and the insertion body 23 is correspondingly inserted into the assembly slot 11, so as to fasten the display cloth 22 to the back of the LED screen.

In one embodiment, four of the display body connectors 10 are detachably connected at the four corners of the case body 1, each of the display body connectors 10 comprises a lateral connector 12 and a longitudinal connector 13, each of the assembly slot 11 is disposed on each of the outside of the lateral connector 12 and the longitudinal connector 13 respectively, and the insertion body 23 comprises a lateral insertion body and a longitudinal insertion body, wherein the transversal insert body is inserted in the lateral connection body 12 and the longitudinal insert body is inserted in the longitudinal connection body 13.

Figure 5:
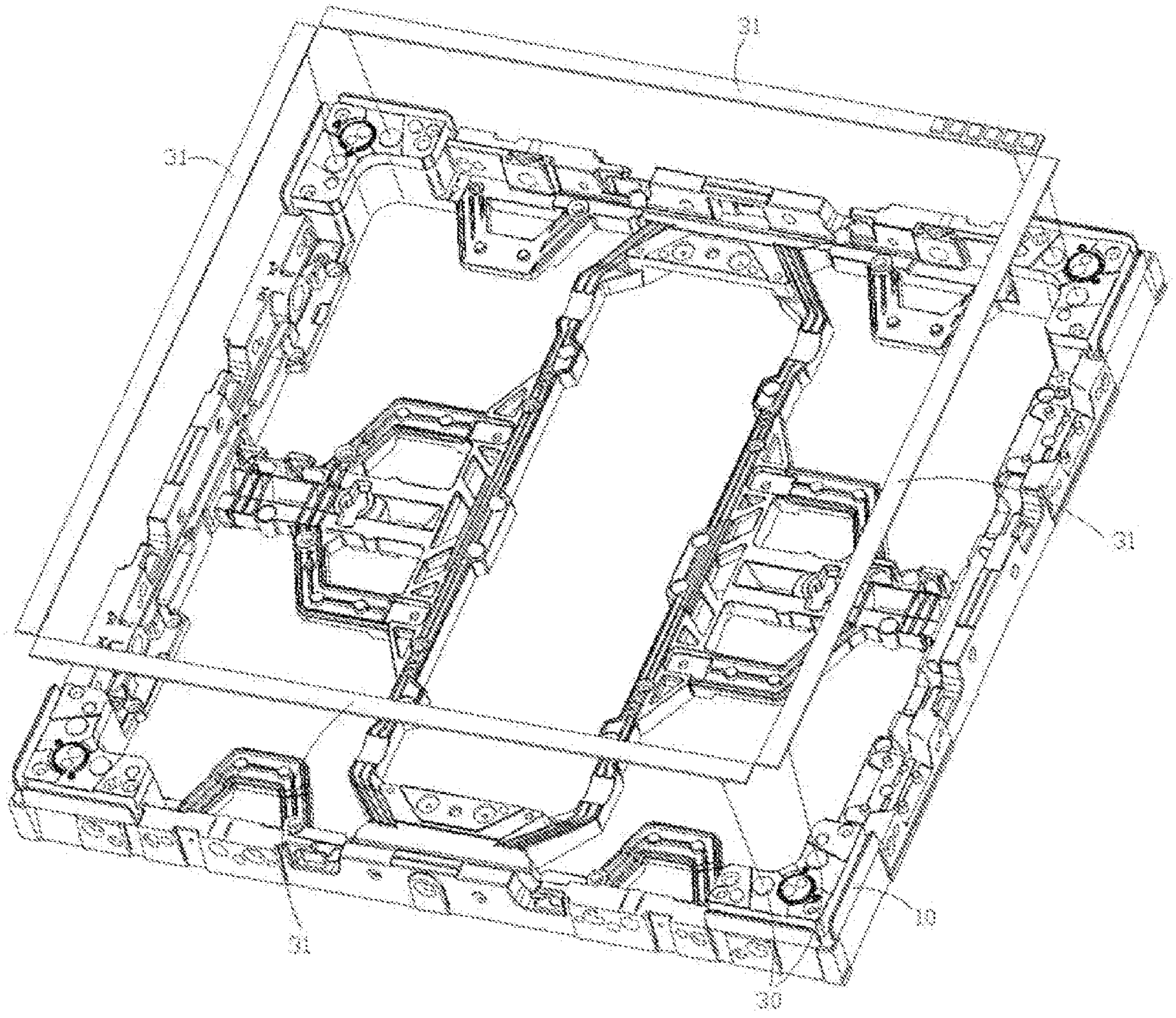
FIG. 5 is a perspective view of a dazzle light bar and light bar connectors of the present invention.

As shown in FIG. 5, in one embodiment, each of the display body connectors 10 is provided with a light bar connector 30, and a dazzle light bar 31 is detachably connected to the light bar connector 30, wherein the light bar 31 has three types of light bars.

The dazzle light bar 31 has three states, and in state one, when there is no connection between the dazzle light bar 31 and the light bar connector 30, the dazzle light bar 31 is separated from the LED screen, and in state two when the dazzle light bar 31 is connected to the light bar connector 30, a dazzle effect is generated by the dazzle light bar 31 at the back of the LED screen, and in state three when the dazzle light bar 31 is connected to the light bar connector 30, the display body 20 is attached to the display body connector 10, and when the light bar 31 is located in the display body 20, the light bar 31 produces a dazzling effect on the display cloth 22 and the display information 21, wherein the dazzle light bar 31 is an LED light bar and the light bar connector 30 is a magnetic block.

Figure 6:
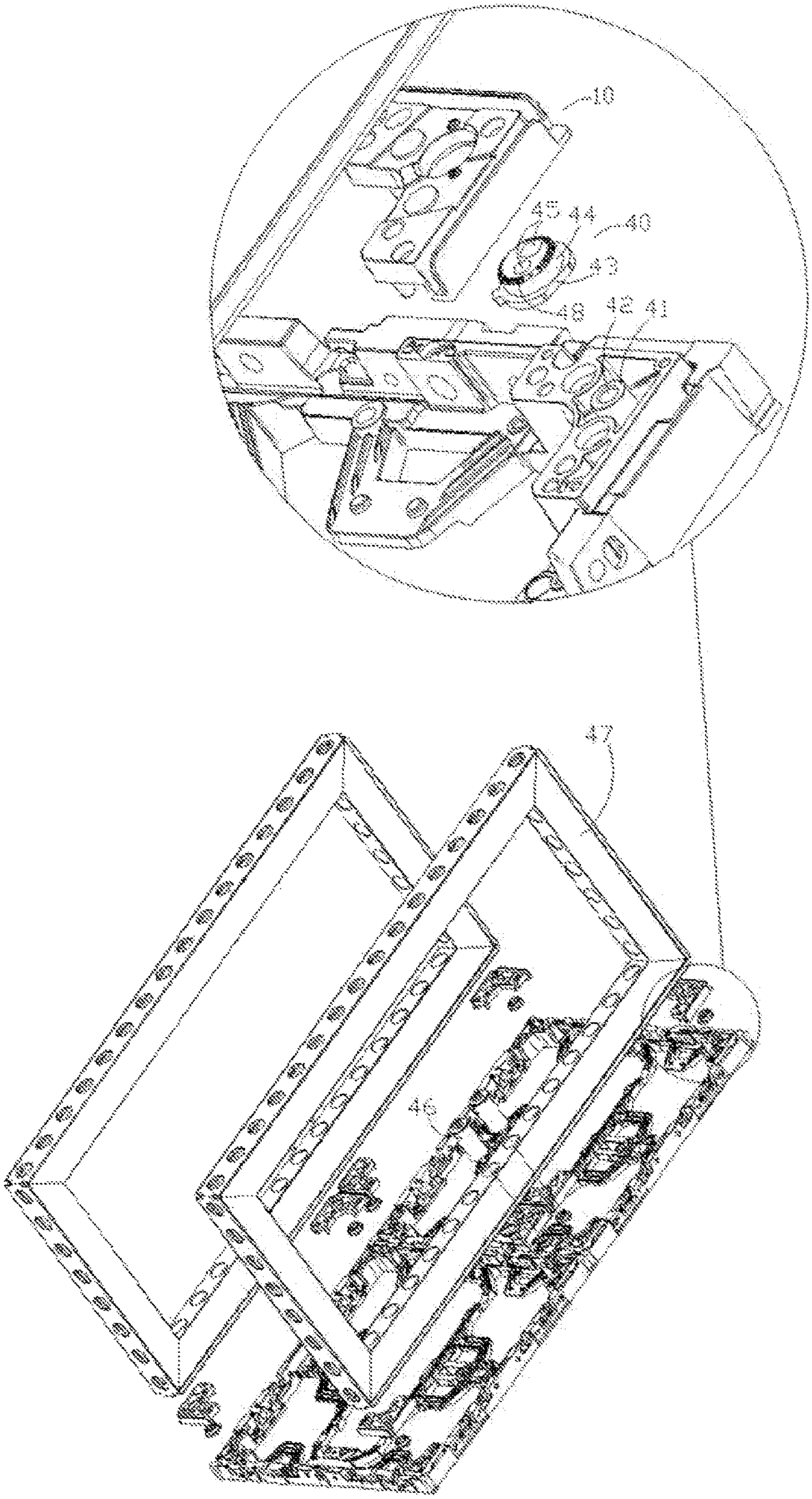
FIG. 6 is a enlarged view of the frame connector of the present invention.
Figure 7:
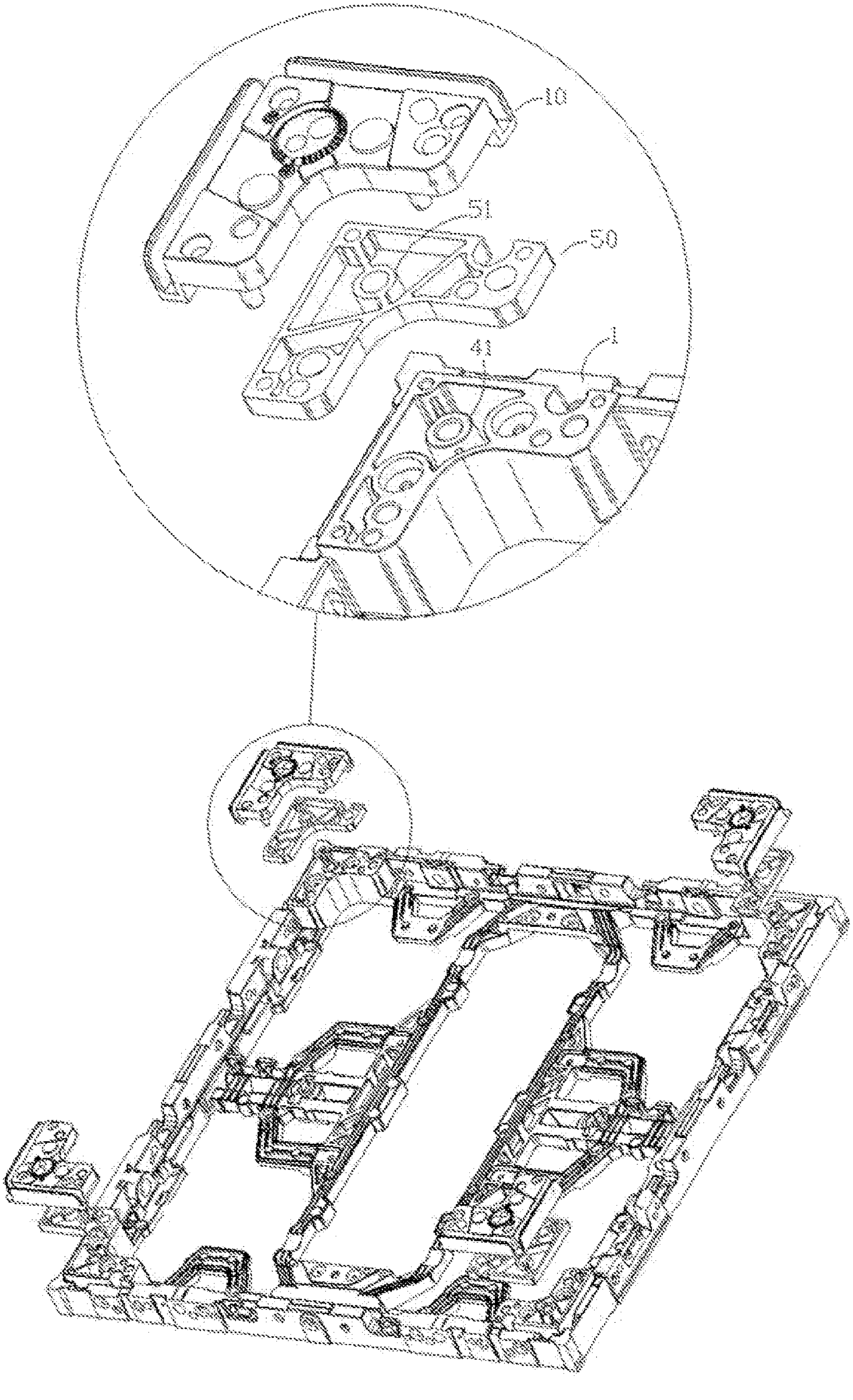
FIG. 7 is a enlarged view of a height-adjustable pad of the present invention.

As shown in FIGS. 6 and 7, in one embodiment, each of the display body connector 10 is provided with a frame connector 40, and the frame connector 40 is provided with an assembly cylinder column 41 on the case body 1 correspondingly, wherein the assembly cylinder column 41 is provided with an assembly hole 42.

One end of the frame connector 40 is inserted in the display body connector 10, and the other end of the frame connector 40 is socketed on the assembly cylinder column 41.

The frame connector 40 comprises a connector body 43 and a rotary knob 44 rotationally connected to the connector body socketed on the assembly cylinder column 41.

The rotary knob 44 is provided with a plurality of matching holes 45, and the plurality of matching holes 45 correspond to the assembly holes 42, such that rotation of the rotary knob 44 enables one of the matching hole 45 to uniquely correspond to the assembly hole 42, which means to adapt the assembly insertion of an assembler 46.

In other words, by means of determining the correspondence between different sizes of the matching holes 45 and the assembly holes 42, the frame connector 40 can be matched with the different assemblers 46, which means to enables the case body 1 to be assembled on different sizes of fixing mounting frames 47 to achieve general suitability.

In one embodiment, the rotary knob 44 is provided with an adjusting tooth ring 48 at the top of the rotary knob 44, wherein the adjusting tooth ring 48 is exposed to the outside of the display body connector 10 so as to facilitate rotation and adjustment.

As shown in FIG. 7, in one embodiment, each of the display body connector 10 comprises a height-adjustable pad 50 provided between the display body connector 10 and the case body 1.

The height-adjustable pad enables the overall thickness of the LED screen to be adjusted, such that the overall thickness of the LED screen can be adjusted, so as to enable the LED screen to have various overall thickness specifications, which means to be able to match the different requirements of customers, as well as to enable the LED screen to be assembled on different specifications of the fixing mounting frames 47 to achieve general suitability.

In one embodiment, the height-adjustable pad 50 has a sleeve 51 which is connected between the connector body 43 and the assembly cylinder column 41.

Figure 8:
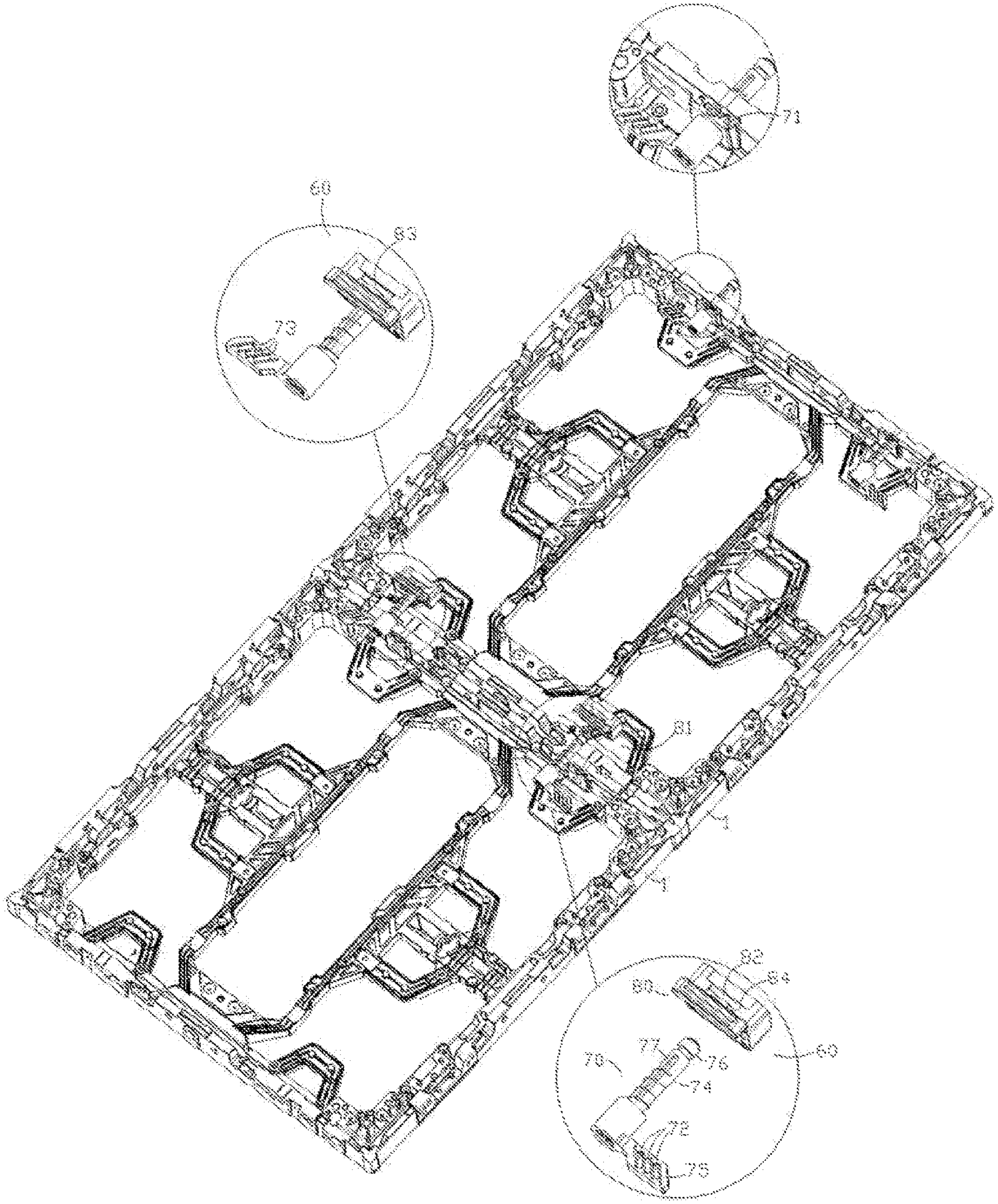
FIG. 8 is a enlarged view of the case assembly warning lock of the present invention.
Figure 9:
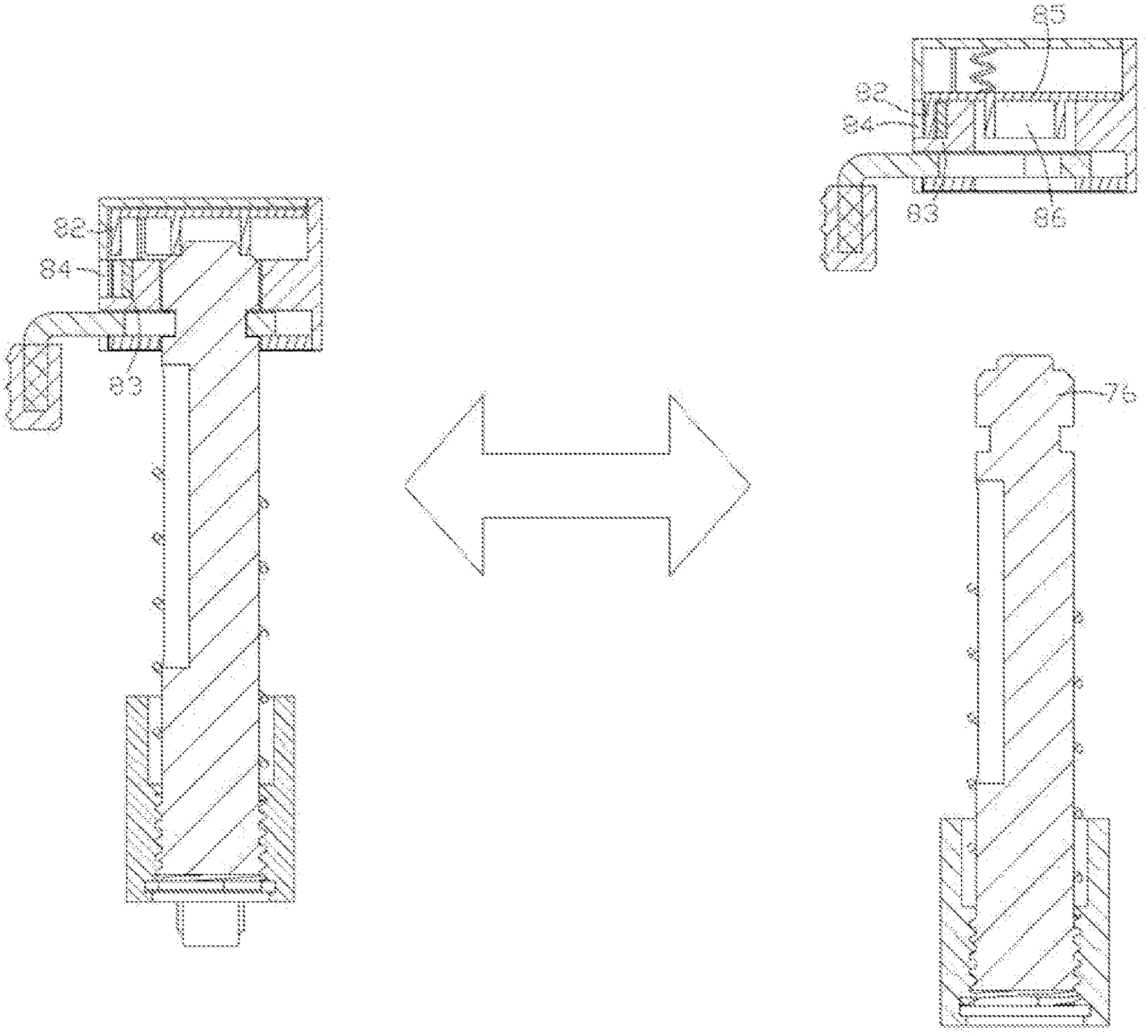
FIG. 9 is a schematic view of the action of the case assembly warning lock of the present invention.

As shown in FIGS. 8 and 9, in one embodiment, the LED screen further comprises a case assembly warning lock 60 comprising a lock cylinder 70 and a lock body 80, wherein the lock cylinder 70 is connected to one end of the case body 1 and the lock body 80 is connected to the other end of the case body 1.

The lock cylinder 70 on one case body 1 corresponds to the lock 80 on the other case body 1, and the case assembly warning lock 60 is provided between any two adjacent the case body 1, and a plurality of the case assembly warning locks 60 can connect a plurality of case bodies 1 together to form a large LED screen.

The case body 1 is provided with a lock mounting position 71 and a lock body mounting position 81, wherein the lock cylinder 70 is assembled in the lock mounting position 71, and the lock body 80 is fixed in the lock body mounting position 81, and in one embodiment, the lock mounting position 71 is a perforation.

The lock cylinder 70 is provided with a lock cylinder opening label 72 and a lock cylinder locking label 73, and the lock body 80 is provided with a lock body opening label 82 and a lock body locking label 83, wherein the lock cylinder opening label 72 corresponds to the lock body opening label 82 and the lock cylinder locking label 73 corresponds to the lock body locking label 83.

Wherein when the case assembly warning lock 60 is in the open state, the lock cylinder 70 shows the lock cylinder opening label 72, and the lock body 80 shows the lock body opening label 82, wherein when the case assembly warning lock 60 is in the locking state, the lock cylinder 70 shows the lock cylinder locking label 73, and the lock body 80 shows the lock body locking label 83, which is able to intuitively show the state of the case assembly warning lock 60 to the assembling personnel in the above manner, so as to achieve the function of facilitating the assembly, improving the assembly efficiency, and improving the using experience.

In one embodiment, the lock cylinder 70 comprises a rotary column 74 and a label handle 75, wherein the label handle 75 is connected to the end of the rotary column 74, and the label handle 75 is synchronously rotated with the rotary column 74, and the lock cylinder opening label 72 and the lock cylinder locking label 73 are set on both sides of the label handle 75 respectively.

The end of the rotary column 74 is provided with a column head 76, and the rotary column 74 is provided with a column slot 77, and in one embodiment, the column slot 77 can facilitate the movement of the rotary column 74 in the perforation and locking, which should be the prior art and will not be repeated herein.

In one embodiment, the lock body 80 is provided with an indication window 84, wherein the lock body opening label 82 is fixedly provided in the indication window 84, and the lock body locking label 83 is movably located on one side of the indication window 84.

Wherein when the case assembly warning lock 60 is in an open state, the lock body opening label 82 is exposed in the indicative window 84, and the lock body opening label 82 shields the lock body locking label 83, wherein when the case assembly warning lock 60 is in a locking state, the lock body opening label 82 is moved away from the indicative window 84, and the lock body opening label 82 removes the shading of the lock body locking label 83, and the lock body locking label 83 is exposed in the indicator window 84.

In one embodiment, the lock body opening label 82 is attached to an action body 85 corresponds to the column head 76, and the action body 85 is provided with an insertion cavity 86.

When the case assembly warning lock 60 is converted from the opening state to the locking state, the column head 76 moves and is inserted into the insertion cavity 86, and the column head 76 drives the lock body opening label 82 by the action body 85, the lock body opening label 82 removes the shading of the lock body locking label 83, and the lock body locking label 83 is exposed in the indication window 84.

Figure 10:
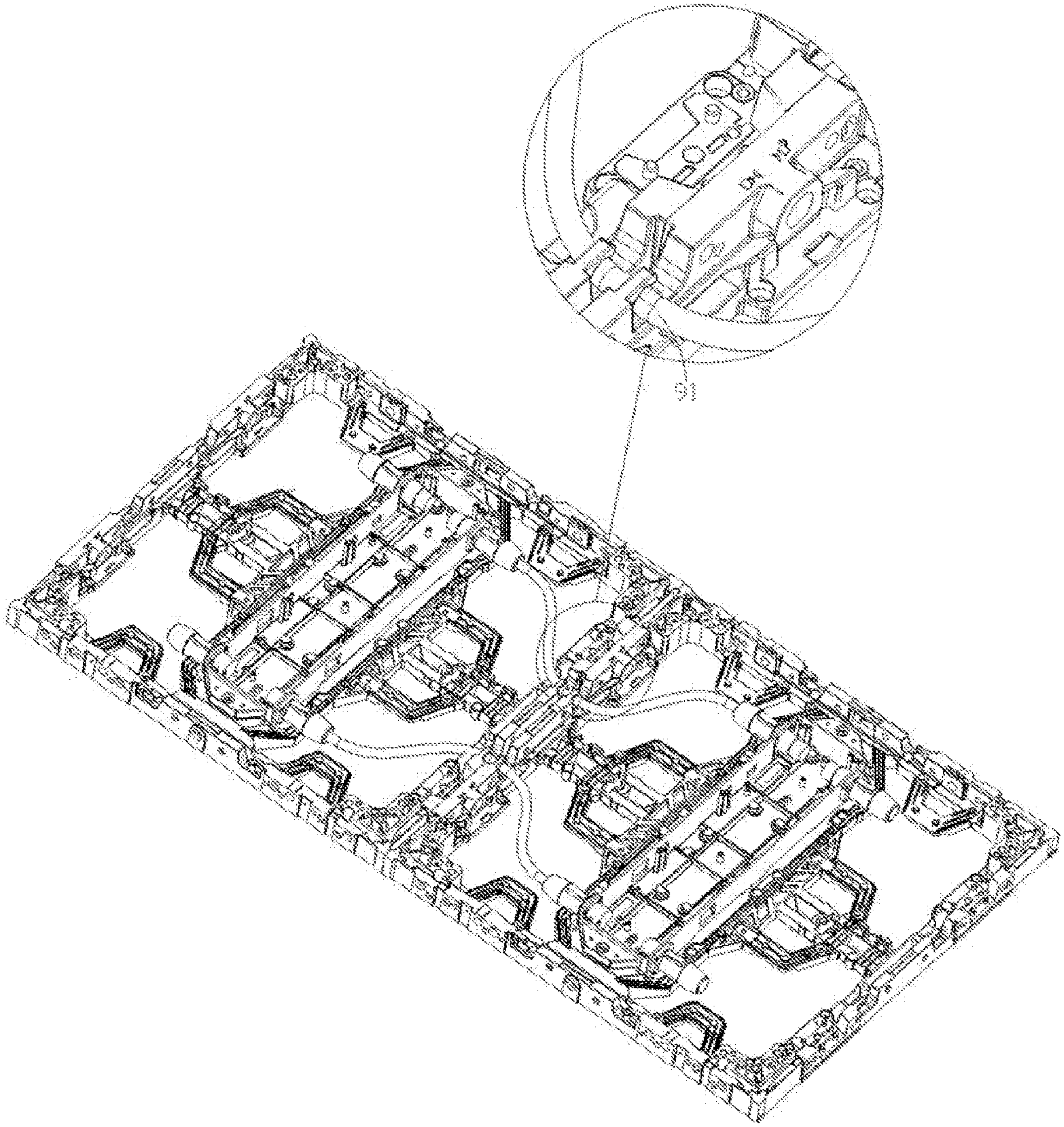
FIG. 10 is a enlarged view of cable-fixing holes of the present invention.

As shown in FIG. 10, in one embodiment, the LED screen further comprises a cable fixing hole 91 and a connector receiving hole, wherein the cable fixing hole 91 and the connector receiving hole are provided on the case body 1, wherein the cable fixing hole 91 is used to receive cable, and the connector receiving hole is used to receive unused data connectors, power connectors, and the like.

Figure 11:
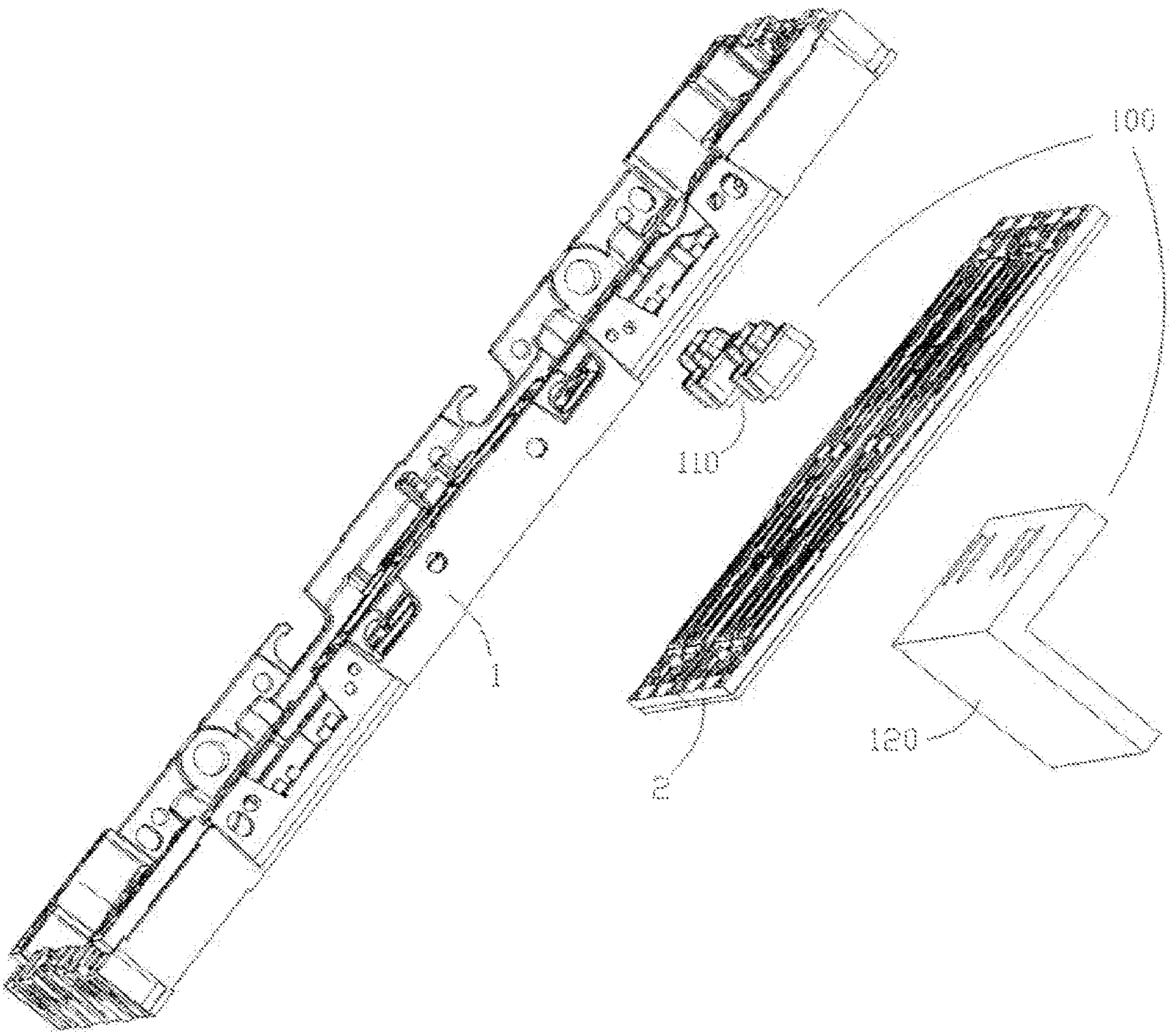
FIG. 11 is a perspective view of the LED module display system of the present invention.
Figure 12:
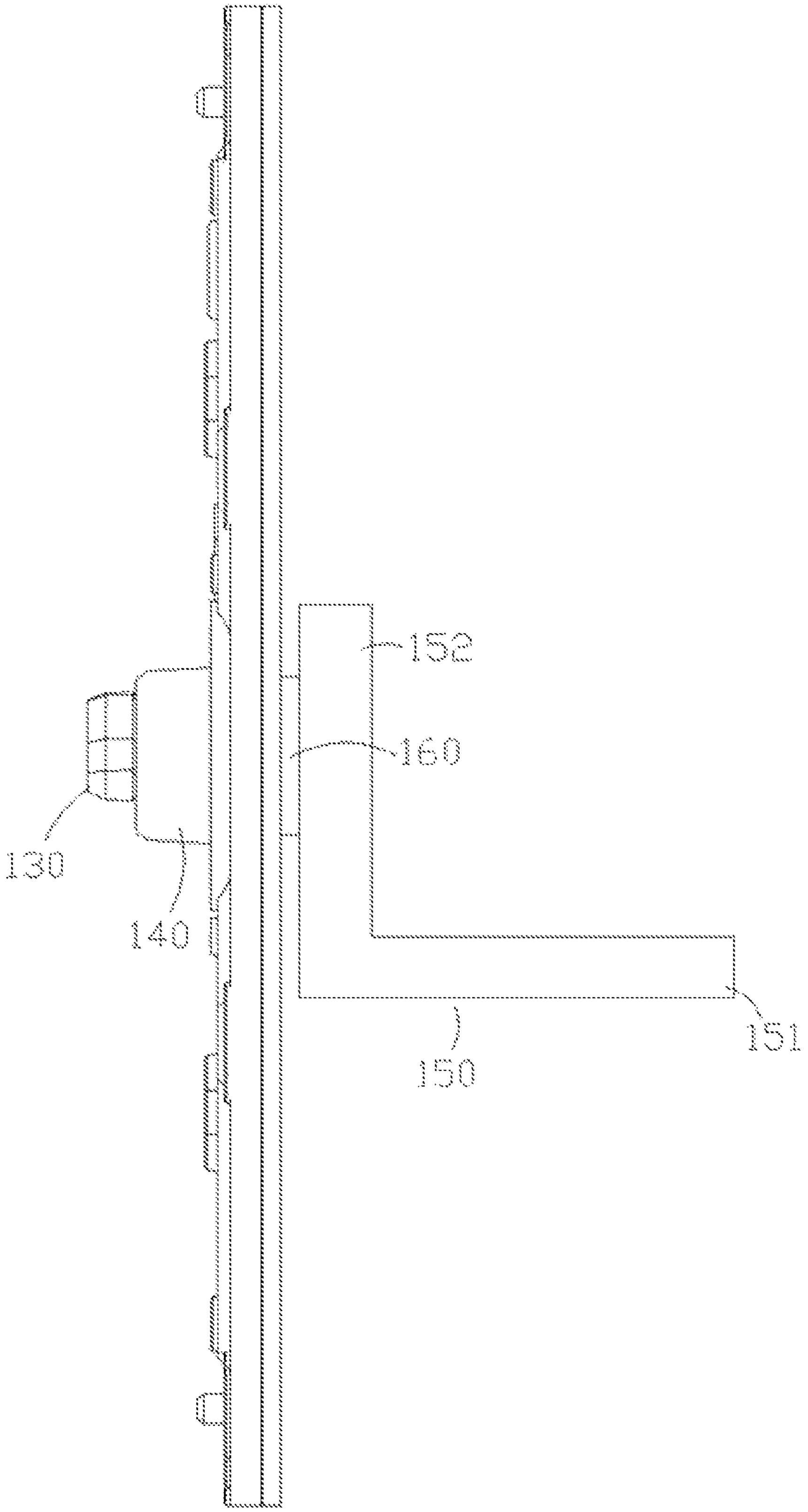
FIG. 12 is a side view of the LED module display system of the present invention.
Figure 13:
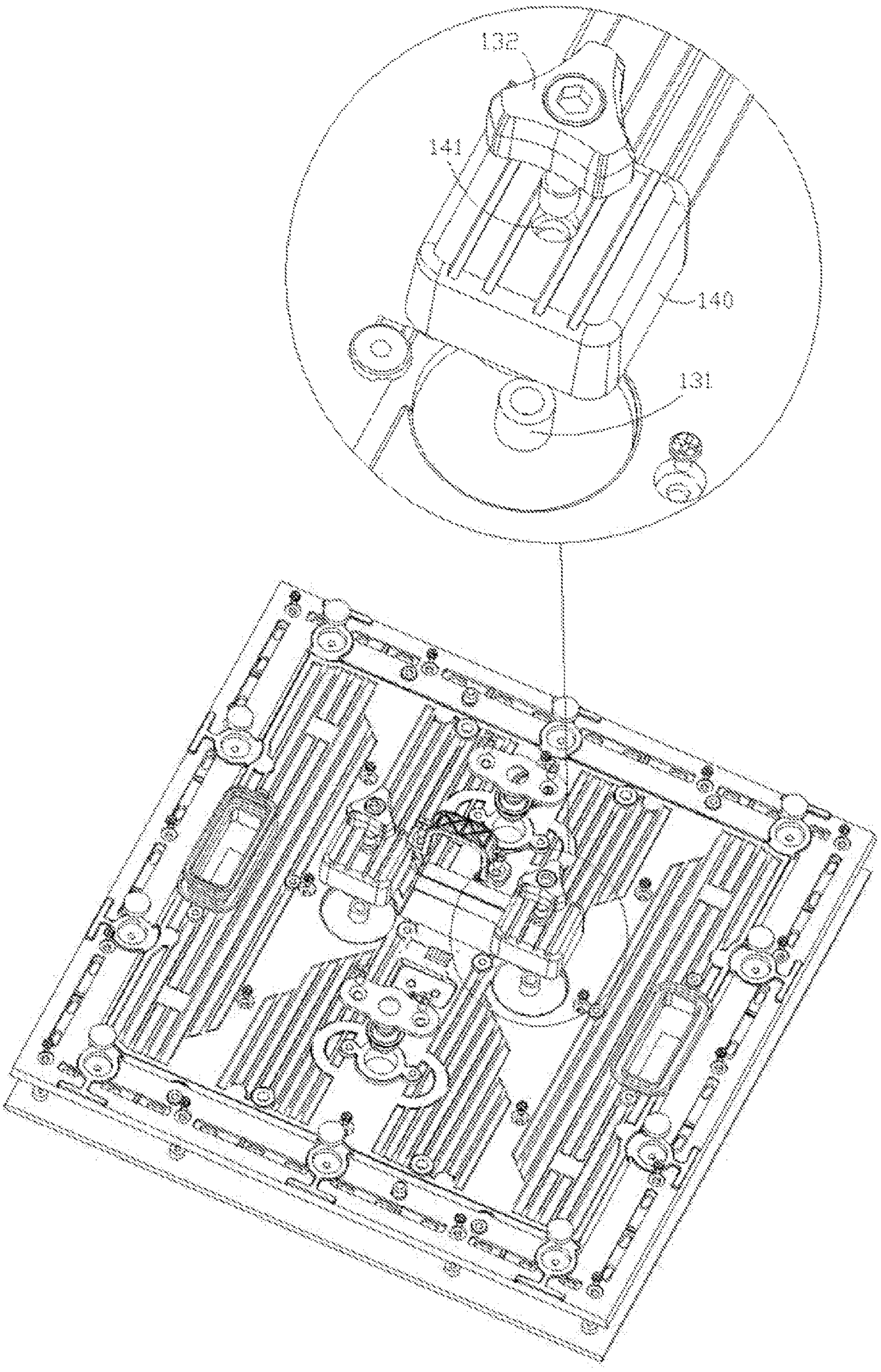
FIG. 13 is a enlarged view of a fastener of the present invention.

As shown in FIGS. 11 to 13, the LED screen further comprises an LED module display system 100 connected to the LED screen module 2, and the LED module display system 100 is used to set up exhibits on the front side of the LED screen module 2, so as to achieve the effect of physical display.

When in operation, a plurality of the LED screen modules 2 are connected to the case body 1, and a plurality of the LED screen modules 2 are energized to emit light and form image information on the front side of each of the LED screen modules 2.

The LED module display system 100 sets up the exhibits on the front of the LED screen modules 2, so as to achieve the effect of physical display.

When the LED screen module 2 is in a non-illuminated state, the LED module display system 100 sets up the exhibits on the front side of the LED screen module 2 for exhibit display.

When the LED screen module 2 is in a light-emitting state, the LED module display system 100 sets up the exhibits in the front of the LED screen module 2 for displaying the exhibits, in the meanwhile, the LED screen module 2 forms a background light around the exhibits so as to achieve a dazzling effect for the exhibits to enhance the display effect of the exhibits.

The LED module display system 100 comprises an exhibition frame fixing device 110 and an exhibition frame 120, wherein the exhibition frame fixing device 110 is provided at the back of the LED screen module 2, and the exhibition frame 120 is provided at the front of the LED screen module 2, wherein the exhibition frame fixing device 110 is used to fix the exhibition frame 120 to the front of the LED screen module 2, and the exhibits are set up on the exhibition frame 120.

Various embodiments that can support the functions of the LED module display system 100 are described below.

Embodiment 1: The exhibition frame fixing device 110 comprises a fastener 130 and a fixing magnetic block 140, the fastener 130 is used to connect the fixing magnetic block 140 to the back of the LED screen module 2, wherein the exhibition frame 120 comprises an exhibition frame body 150 and an exhibition frame magnetic block 160, and the exhibition frame magnetic block 160 is fixedly connected to the exhibition frame body 150, and magnetic suction is established between the exhibition frame magnetic block 160 and the fixing magnetic block 140, whereby the fixing magnetic block 140 magnetically attracts the exhibition frame 120 to the front side of the LED screen module 2, the exhibits are erected on the exhibition frame body 150.

In the embodiment, the fastener 130 comprises a module connecting column 131 and a magnetic block assembler 132, wherein the fixing magnetic block 140 is provided with a magnetic block hole 141, and the module connecting column 131 is fixedly disposed at the back of the LED screen module 2, and the magnetic block assembler 132 is connected in the module connecting column 131 through the magnetic block hole 141, so as to fix the fixing magnetic block 140 on the back of the LED screen module 2, wherein the exhibition frame body 150 comprises a lateral plate 151 and a longitudinal plate 152, wherein the longitudinal plate 152 is fixedly connected to the lateral plate 151, and the exhibition frame magnetic block 160 is fixedly connected to the longitudinal plate 152, and the exhibits are set up on the lateral plate 151.

Embodiment 2: the exhibition frame fixing device 110 is a penetrating device, and the LED screen module 2 is provided with a perforation, wherein the penetrating device is fixed on the back of the LED screen module 2, and the front end of the penetrating device passes through the perforation and connects to the exhibition frame 120, so as to fix the exhibition frame 120 on the front of the LED screen module 2.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from the principles. Therefore, the invention comprises all modifications encompassed within the spirit and scope of the following claims.

What is claimed is:

1. A multifunctional LED screen, comprising:

a case body, and a plurality of LED screen modules connected to a front of the case body, wherein the LED screen also comprises a display body connector and a display body, and the display body connector is detachably connected to the case body, and the display body is detachably connected to the display body connector, wherein the display body is provided with a display information, and when the display body connector is connected to the case body and the display body is connected to the display body connector, the LED screen is capable of displaying a content of the display information on a back of the LED screen thereof, wherein a plurality of display body connectors are detachably connected to back side corner positions of the case body, and the plurality of display body connectors is the same in structure, wherein each of the display body connectors is provided with an assembly slot, wherein the display body comprises a display cloth and an insert body, the insert body is connected around the display cloth, and the insert body is correspondingly inserted in the assembly slot to fix the display cloth on the back of the LED screen.

2. The multifunctional LED screen, as recited in claim 1, wherein four display body connectors are detachably connected at four corner positions of the case body, wherein each of the display body connectors comprises a lateral connection body and a longitudinal connection body, and each of assembly slots is provided at the outside of the lateral connection body and the longitudinal connection body respectively, wherein the insertion body comprises a lateral insertion body and a longitudinal insertion body, wherein the lateral insertion body is inserted in the lateral connection body as well as the longitudinal insert body is inserted in that longitudinal connection body.

3. The multifunctional LED screen, as recited in claim 1, further comprising a dazzle light bar, wherein each of the display body connectors is provided with a light bar connector, and the dazzle light bar is detachably connected to the light bar connector, wherein the dazzle light bar has three states, and in state one when there is no connection between the dazzle light bar and the light bar connector, the dazzle light bar is separated from the LED screen, and in state two when the dazzle light bar is connected to the light bar connector, a dazzle effect is generated by the dazzle light bar on the back of the LED screen, and state three when the dazzle light bar is connected to the light bar connector, the display body is connected to the display body connector, and when the dazzle light bar is disposed in that display body, a dazzling effect is produced by that dazzle light bar on the display cloth as well as on that display information.

4. The multifunctional LED screen, as recited in claim 1, wherein each of the display body connectors is provided with a frame connector, and the frame connector is provided with an assembly cylinder column on the case body correspondingly, wherein the assembly cylinder column is provided with an assembly hole, wherein one end of the frame connector is inserted in the display body connector, and the other end of the frame connector is socketed on the assembly cylinder column, wherein the frame connector comprises a connector body and a rotary knob rotationally connected to the connector body socketed on the assembly cylinder column, wherein the rotary knob is provided with a plurality of matching holes corresponding to assembly holes, and rotation of the rotary knob enables one of the matching holes to uniquely correspond to the assembly hole, so as to accommodate assembly insertion of an assembler.

5. The multifunctional LED screen, as recited in claim 4, wherein the rotary knob is provided with an adjusting tooth ring at the top of the rotary knob, and the adjusting tooth ring is exposed to the outside of the display body connector.

6. The multifunctional LED screen, as recited in claim 4, wherein each of the display body connectors comprises a height-adjustable pad provided between the display body connector and the case body.

7. The multifunctional LED screen, as recited in claim 6, wherein the height-adjustable pad has a sleeve connected between the connector body and the assembly cylinder column.

8. The multifunctional LED screen, as recited in claim 1, wherein the LED screen further comprises a case assembly warning lock, and the case assembly warning lock comprising a lock cylinder and a lock body, wherein the lock cylinder is attached to one end of the case body and the lock body is attached to the other end of the case body, wherein the lock cylinder on one end of the case body corresponds to the lock body on the other end of the case body, the case assembly warning lock is provided between any two adjacent of case bodies, and a plurality of case assembly warning locks are capable of connecting a plurality of the case bodies together.

9. The multifunctional LED screen, as recited in claim 8, wherein the case body is provided with a lock cylinder mounting position and a lock body mounting position, wherein the lock cylinder is assembled in the lock cylinder mounting position, and the lock body is fixed to the lock body mounting position, wherein the lock cylinder is provided with a lock cylinder opening label and a lock cylinder locking label, and the lock body is provided with a lock body opening label and a lock body locking label, wherein the lock cylinder opening label corresponds to the lock body opening label, and the lock cylinder locking label corresponds to the lock body locking label, wherein when the case assembly warning lock is in an open state, the lock cylinder displays the lock cylinder opening label and the lock body displays the lock body opening label, and when the case assembly warning lock is in a locked state, the lock cylinder displays the lock cylinder locking label and the lock body displays the lock body locking label.

10. The multifunctional LED screen, as recited in claim 9, wherein the lock cylinder comprises a rotary column and a label handle, wherein the label handle is connected to an end of the rotary column, and the label handle rotates synchronously with the rotary column, wherein the lock cylinder opening label and the lock cylinder locking label are provided on both sides of the label handle respectively, wherein the rotary column is provided with a column head at the end of the rotary column, and the rotary column is provided with a column head slot, wherein the lock body is provided with an indication window, the lock body opening label is fixedly provided in the indication window, and the lock body locking label is movably located on one side of the indication window, wherein when the case assembly warning lock is in an opening state, the lock body opening label is exposed in the indication window as well as the lock body opening label shields the lock body locking label, and when the case assembly warning lock is in a locked state, the lock body opening label is removed from the indication window as well as the lock body opening label removes the shading of the lock body locking label, and the lock body locking label is exposed in the indication window.

11. The multifunctional LED screen, as recited in claim 10, wherein the lock body opening label is attached to an action body corresponding to the column head, and the action body is provided with an insertion cavity, wherein when the case assembly warning lock is changed from the opening state to the locked state, the column head moves and is inserted into the insertion cavity, and the column head drives the lock body opening label through the action body, and the lock body opening label removes the shading of the lock body locking label, and the lock body locking label is exposed in the indication window.

12. The multifunctional LED screen, as recited in claim 1, wherein the LED screen further comprises a cable fixing hole and a connector receiving hole, and the cable fixing hole and the connector receiving hole are provided on the case body.

13. The multifunctional LED screen, as recited in claim 1, wherein the LED screen further comprises an LED module display system, wherein the LED module display system is connected to an LED screen module, and the LED module display system is used to set up an exhibit on a front side of the LED screen module.

14. The multifunctional LED screen, as recited in claim 13, wherein when the LED screen module is in a non-illuminated state, the LED module display system is used to set up the exhibit on the front side of the LED screen module for displaying the exhibit, wherein when the LED screen module is in the light-emitting state, the exhibit is set up by the LED module display system on the front side of the LED screen module for the exhibit display, and in the meanwhile, a background light is formed around the exhibit by the LED screen module.

15. The multifunctional LED screen, as recited in claim 13, wherein the LED module display system comprises an exhibition frame fixing device and an exhibition frame, wherein the exhibition frame fixing device is provided at a back side of the LED screen module and the exhibition frame is provided at a front side of the LED screen module, wherein the exhibition frame fixing device is used to fix the exhibition frame to the front of the LED screen module, and the exhibit is set up on the exhibition frame.

16. The multifunctional LED screen, as recited in claim 15, wherein the exhibition frame fixing device comprises a fastener and a fixing magnetic block, and the fastener is used to connect the fixing magnetic block to the back side of the LED screen module, wherein the exhibition frame comprises an exhibition frame body and an exhibition frame magnetic block, and the exhibition frame magnetic block is fixedly connected to the exhibition frame body, wherein a magnetic suction is established between the exhibition frame magnetic block and the fixing magnetic block, whereby the fixing magnetic block magnetically attracts the exhibition frame to the front side of the LED screen module, the exhibits are set up on the exhibition frame body.

17. The multifunctional LED screen, as recited in claim 16, wherein the fastener comprises a module connecting column and a magnetic block assembler, and the fixing magnetic block is provided with a magnetic block hole, the module connecting column is fixedly provided on the back of the LED screen module, and the magnetic block assembler is connected in the module connecting column through the magnetic block hole, so as to fix the fixing magnetic block on the back of LED screen module, wherein the exhibition frame body comprising a lateral plate and a longitudinal plate, and the longitudinal plate is fixedly connected to the lateral plate, and the exhibition frame magnetic block is fixedly connected to the longitudinal plate, and the exhibit is set up on the lateral plate.

18. The multifunctional LED screen, as recited in claim 15, wherein the exhibit frame fixing device is a penetrating device, the LED screen module is provided with a perforation, and the penetrating device is fixed to a back side of the LED screen module, wherein the front end of the penetrating device passes through the perforation and is connected to the exhibit frame, so as to fix the exhibit frame to a front side of the LED screen module.

* * * * *